United States Patent [19]
Fukui et al.

[11] Patent Number: 5,109,964
[45] Date of Patent: May 5, 1992

[54] CONICAL ROLLER TYPE CLUTCH APPARATUS

[75] Inventors: Tetsu Fukui; Yoshimi Oota; Shigekazu Hasegawa, all of Osaka, Japan

[73] Assignee: Kubota Corporation, Osaka, Japan

[21] Appl. No.: 661,414

[22] Filed: Feb. 26, 1991

[30] Foreign Application Priority Data

Mar. 8, 1990 [JP] Japan ........................., 2-57791
Sep. 18, 1990 [JP] Japan ........................... 2-249835

[51] Int. Cl.$^5$ .............................................. F16D 41/06
[52] U.S. Cl. .................... 192/48.92; 192/47; 192/87.14; 192/45
[58] Field of Search ............... 192/44, 45, 48.92, 65, 192/66, 72, 85 CA, 87.16, 87.1, 87.11, 87.14

[56] References Cited

U.S. PATENT DOCUMENTS

| 1,788,301 | 1/1931 | Humfrey | 192/48.92 |
| 1,834,843 | 12/1931 | Humfrey | 192/45 |
| 1,929,782 | 10/1933 | Hughes | 192/48.92 |
| 3,557,921 | 1/1971 | Takada | 192/45 |
| 3,800,927 | 4/1974 | Takata | 192/45 |

FOREIGN PATENT DOCUMENTS

| 46-21126 | 6/1971 | Japan . |
| 55-51129 | 4/1980 | Japan . |
| 58-52092 | 11/1983 | Japan . |
| 445184 | 3/1936 | United Kingdom . |

Primary Examiner—Richard Lorence
Attorney, Agent, or Firm—Webb, Burden, Ziesenheim & Webb

[57] ABSTRACT

A rolling clutch apparatus having two one-way transmission mechanisms arranged axially of a drive shaft and a driven shaft. Each transmission mechanism includes an inner ring defining a conical outside surface, an outer ring disposed coaxially with the inner ring and defining a conical inside surface, and tapered rollers arranged between the conical surfaces of the inner and outer rings. The transmission mechanisms are shiftable at the same time so that the rollers in one of the transmission mechanisms are displaced axilly to be pressed between the conical surfaces of the inner and outer rings whereby the inner and outer rings rotate together to transmit drive.

9 Claims, 8 Drawing Sheets

CONICAL ROLLER TYPE CLUTCH APPARATUS

BACKGROUND OF THE INVENTION

1. Field of the Invention

The present invention relates to a clutch apparatus using conical roller one-way clutches.

2. Description of the Prior Art

A rolling one-way clutch using conical rollers is known from Japanese Patent Publication No. 46-21126, for example. This rolling one-way clutch includes an inner ring defining a conical outside surface, and an outer ring defining a conical inside surface. The two rings are supported to be rotatable on a single main axis. Rollers are arranged between the conical surfaces of the two rings for rolling about axes not parallel to the main axis. When a relative rotation occurs between the inner and outer rings, drive is transmitted between the two rings provided that the rotation is in a predetermined direction. If the rotation is in the opposite direction, the inner and outer rings are allowed to rotate relative to each other.

Further, Japanese Patent Publication No. 55-51129 discloses a different rolling one-way clutch. In this publication, drive transmission through the one-way clutch is broken by axially sliding an inner ring having rollers to disengage the rollers from an outer ring. Thus, this known apparatus selectively produces a state to act as a one-way clutch, i.e. a state for transmitting drive only in one direction, and a state to completely break drive transmission in both directions.

SUMMARY OF THE INVENTION

An object of the present invention is to provide a novel clutch apparatus which, by effective use of the transmission mechanism of the rolling type one-way clutch noted above, quickly and smoothly produces a state for transmitting drive in opposite directions and a state for breaking the drive transmission in both directions.

The above object is fulfilled by a clutch apparatus comprising rolling type one-way clutches disposed between a first shaft and a second shaft and having different directions of transmission, and rollers engageable with and disengageable from outer rings or inner rings of the one-way clutches. The one-way clutches become operative when the outer rings or inner rings of the clutches engage with the rollers. As a result, the first and second shafts are interconnected to transmit drive in both directions. When the outer rings or inner rings of the clutches engage with the rollers, the drive transmission in either direction between the first and second shafts is of course broken, i.e. both forward rotation and backward rotation become impossible.

Thus, the present invention realizes a rolling clutch apparatus which is capable of transmitting drive in both forward and backward directions and quickly and smoothly breaking the drive transmission by effectively using the excellent transmission mechanism of the rolling type one-way clutch.

The other objects and features of this invention will be understood from the following description made with reference to the accompanying drawings.

DETAILED DESCRIPTION OF THE PREFERRED EMBODIMENTS

[First Embodiment]

Figure 1:
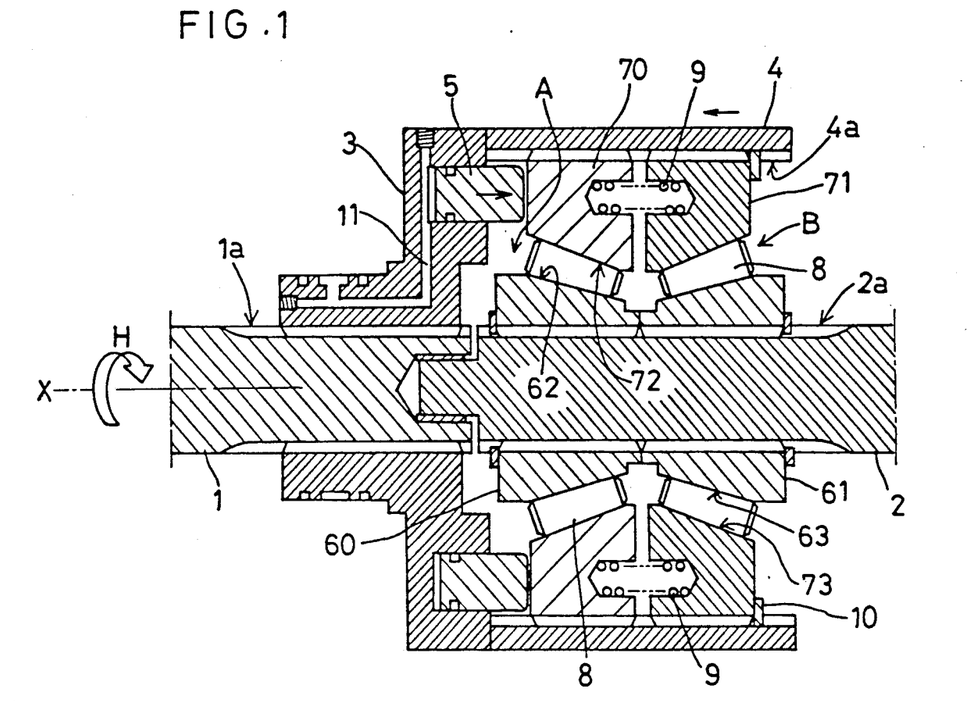
FIG. 1 is a sectional view of a rolling clutch apparatus in a first embodiment of the present invention.
Figure 2:
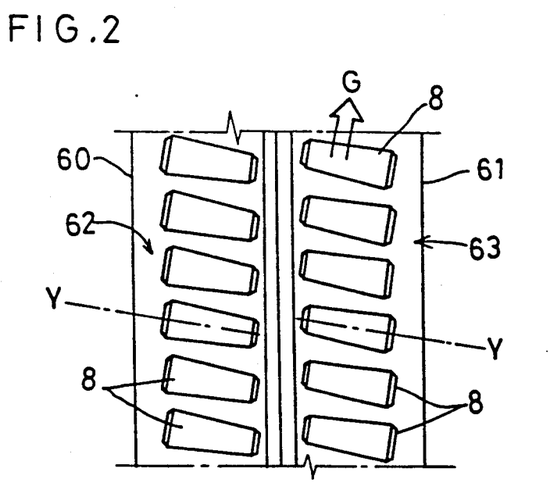
FIG. 2 is a view in development showing an arrangement of rollers in the first embodiment.

FIGS. 1 and 2 show a rolling clutch in a first embodiment of the present invention.

This clutch makes and breaks drive transmission between a first, drive shaft 1 and a second, driven shaft 2 extending coaxially along a main axis X. The clutch comprises a flange 3 meshed with splines 1a of the first shaft 1 to be slidable along the main axis X and to effect torque transmission, a tubular member 4 fixed peripherally of the flange 3, two transmission mechanisms A and B arranged between the tubular member 4 and second shaft 2, and a hydraulic piston 5 supported by the flange 3 for engaging and disengaging the clutch. The transmission mechanisms A and B are similar in construction to a one-way clutch. The transmission mechanisms A and B have opposite directions of drive transmission, and are therefore substantially symmetric to form mirror images of each other.

The transmission mechanisms A and B, respectively, include inner rings 60 and 61 meshed with splines 2a of the second shaft 2, outer rings 70 and 71 meshed with splines defined on an inside wall of the tubular member 4 to be slidable along the main axis X and to effect torque transmission, and tapered rollers 8 arranged between conical outside surfaces 62 and 63 of the inner rings 60 and 61 and conical inside surfaces of the outer rings 70 and 71. As shown in FIG. 2, the rollers 8 are arranged to roll about axes Y not parallel to the main axis X.

Compression springs 9 are mounted between the outer rings 70 and 71. The tubular member 4 has a clip type stopper 10 mounted on inside walls thereof for limiting sliding movement of the outer ring 71 disposed on the righthand side in FIG. 1. The flange 3 defines an oil passage 11 for supplying pressure oil to the hydraulic piston 5.

The rolling clutch, when in the position shown in FIG. 1, transmits drive to the second shaft 2 regardless of the rotating direction of the first shaft 1. When pressure oil is supplied to the hydraulic piston 5 with drive applied to the first shaft 1, the piston 5 extends as shown in an arrow in FIG. 1, sliding the flange 3 and tubular member 4 together, which enlarges spacing between the outer rings 70 and 71 and inner rings 60 and 61 to place the transmission mechanisms A and B in a non-transmission state, thereby breaking the drive transmission. When the oil supply to the hydraulic piston 5 is stopped, the outer rings 70 and 71 are returned, under the force of compression springs 9, to the drive transmitting position.

The way in which the transmission mechanism B on the righthand side in FIG. 1 operates will be described next.

When the first shaft 1 rotates in the direction of arrow H, the transmission mechanism B, with rotation of the outer rings 71, moves the rollers 8 in the direction of arrow G. The rollers 8 in this movement roll along the conical surface 63 of the inner ring 61.

Since these rollers 8 have axes Y extending as shown in FIG. 2, the rollers 8 move toward a position where the conical surfaces 63 and 73 of the inner and outer rings 61 and 71 are wider apart. Consequently, the transmission mechanism B does not transmit the drive.

When the first shaft 1 rotates in the opposite direction, the rollers 8 move toward a position where the conical surfaces 63 and 73 of the inner and outer rings 61 and 71 are closer to each other. Consequently, the rollers 8 are pressed between the inner and outer rings 61 and 71, thereby combining the inner and outer rings 61 and 71 to transmit the drive.

The lefthand transmission mechanism A has the rollers 8 with the axes Y set so that the transmission characteristics are opposite those of the righthand transmission mechanism B. Thus, when the hydraulic piston 5 is extended to move the outer rings 70 and 71 toward each other, the rollers 8 become incapable of rolling as a result of the increase in the spacing between the inner rings 60 and 61 and outer rings 70 and 71. This position transmits the drive in neither rotating direction.

[Second Embodiment]

Figure 3:
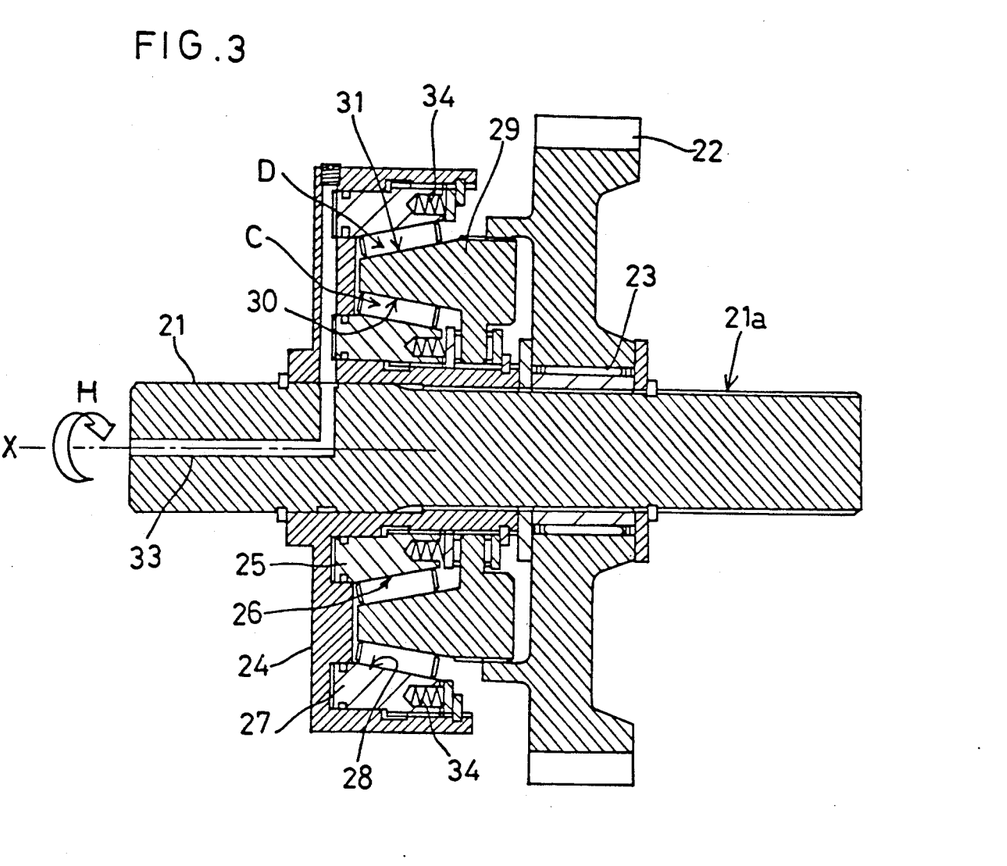
FIG. 3 is a sectional view of a rolling clutch apparatus in a second embodiment of the present invention.
Figure 4:
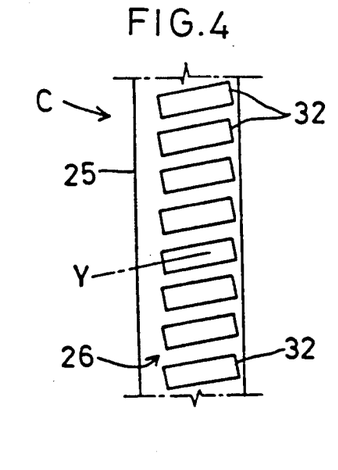
FIG. 4 is a view in development showing an arrangement of inner rollers in the second embodiment.
Figure 5:
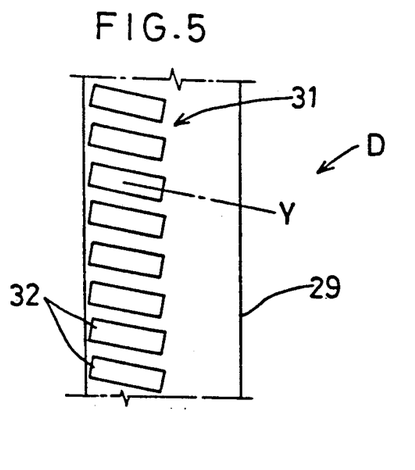
FIG. 5 is a view in development showing an arrangement of outer rollers in the second embodiment.

FIGS. 3 and 4 show a rolling clutch in a second embodiment of the present invention.

This clutch is mounted in a transmission line from a transmission shaft 21 to an output gear 22. As in the first embodiment, the clutch employs two rolling one-way clutch type transmission mechanisms C and D having opposite transmitting directions. The transmission mechanisms C and D are arranged concentrically about a main axis X of the transmission shaft 21.

The output gear 22 is freely rotatably mounted on the transmission shaft 21 through a needle bearing 23. A clutch case 24 is meshed with splines 21a of the transmission shaft 21.

The clutch case 24 includes hydraulic pistons 25 and 27 disposed inwardly (adjacent the axis) and outwardly (away from the axis) for torque transmission to the clutch case 24. An output member 29 is freely rotatably supported in the clutch case 24 and meshed through splines with the output gear 22. The transmission mechanism C includes a plurality of rollers 32 arranged between a conical outside surface 26 of the inner hydraulic piston 25 and a conical inside surface 30 defined in the output member 29. These rollers 32 have axes Y not parallel to the main axis X. The transmission mechanism D includes a plurality of rollers 32 arranged between a conical outside surface 28 of the outer hydraulic piston 27 and a conical outside surface 31 of the output member 29. These rollers 32 also have axes Y not parallel to the main axis X.

In the inner transmission mechanism C, the hydraulic piston 25 acts as an inner ring, and the output member 29 as an outer ring. In the outer transmission mechanism D, the hydraulic piston 27 acts as an outer ring, and the output member 29 as an inner ring. Thus, the output member 29 integrates the outer ring and inner ring of the respective transmission mechanisms.

The transmission shaft 21 and clutch case 24 define an oil passage 33 for supplying pressure oil to the hydraulic pistons 25 and 27. When pressure oil is supplied through the oil passage 33, the respective transmission mechanisms C and D are moved to positions to act as one-way clutches. In this state, drive in either, forward or backward, direction is transmitted from the transmission shaft 21 to the output gear 22. When the oil is drained from the oil passage 33, the hydraulic pistons 25 and 27 are retracted, under the force of compression springs 34 to positions to permit rolling of the rollers 32, thereby transmitting the drive in neither rotating direction.

The respective transmission mechanisms C and D are operable in the same way as the transmission mechanism A and D in the first embodiment, when each transmits the drive. That is, when the transmission shaft 21 rotates in the direction of arrow H in FIG. 3, the inner transmission mechanism C transmits the drive. When the transmission shaft 21 rotates in the opposite direction, the outer transmission mechanism D transmits the drive.

[Third Embodiment]

Figure 6:
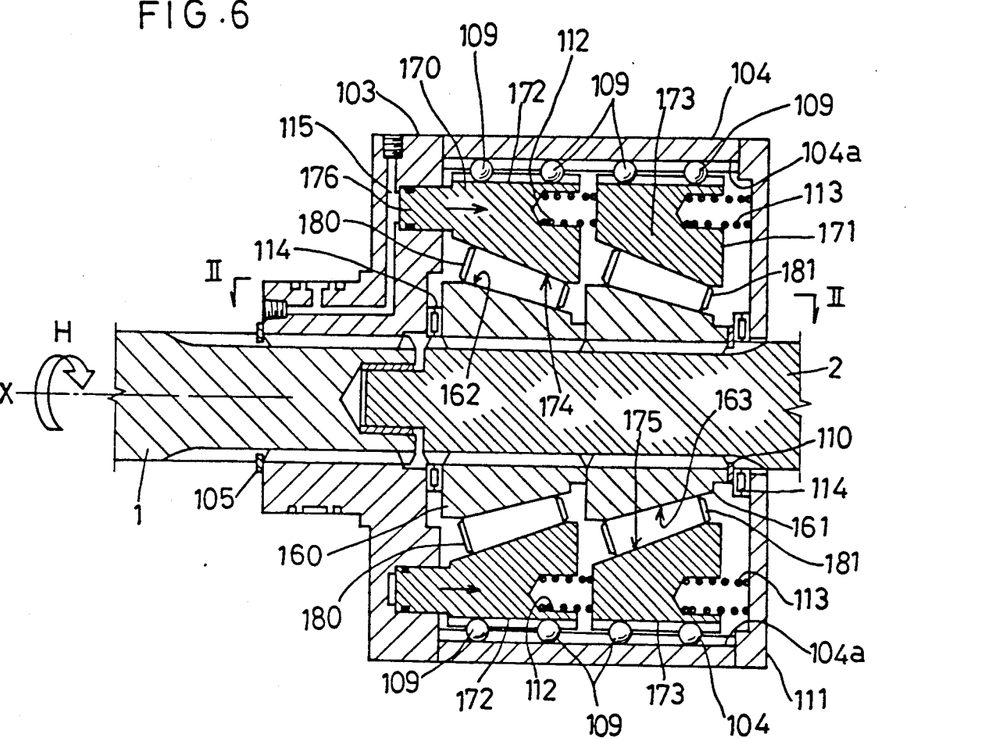
FIG. 6 is a sectional view of a rolling clutch apparatus in a third embodiment of the present invention.

FIG. 6 shows a third embodiment which, as in the peceding embodiments, includes a first, drive transmission shaft 1 and a second, driven transmisison shaft 2 supported coaxially and relatively rotatably.

The first transmission shaft 1 carries a flange 103 splined thereto, and a tubular casing 104 is fixed to the flange 103. Further, the first transmission shaft 1 includes a stopper 105 for locking the flange 103 against sliding movement relative to the first transmission shaft 1.

The second transmission shaft 2 carries a first and a second inner rings 160 and 161 splined thereto and defining conical outside surfaces 162 and 163, respectively, which are facing the same direction. The second transmission shaft 2 includes a stopper 110 for locking the first and second inner rings 160 and 161 against sliding movement relative to the second transmission shaft 2.

The casing 104 contains a first and a second outer rings 170 and 171 defining conical inside surfaces 174 and 175, respectively. Grooves 104a, 172 and 173 are defined in inside surfaces of the casing 104 and outside surfaces of the first and second outer rings 170 and 171, and balls 9 are fitted in to bridge these grooves 104a, 172 and 173. This forms a structure commonly called ball splines by which the first and second outer rings 170 and 171 are rotatable with the casing 104 and slidable along a main axis X of the first and second transmission shafts 1 and 2. The first and second outer rings 170 and 171 are arranged in the same direction so that the two conical surfaces 174 and 175 thereof extend along the conical surfaces 162 and 163 of the first and second inner rings 160 and 161, respectively.

Figure 7:
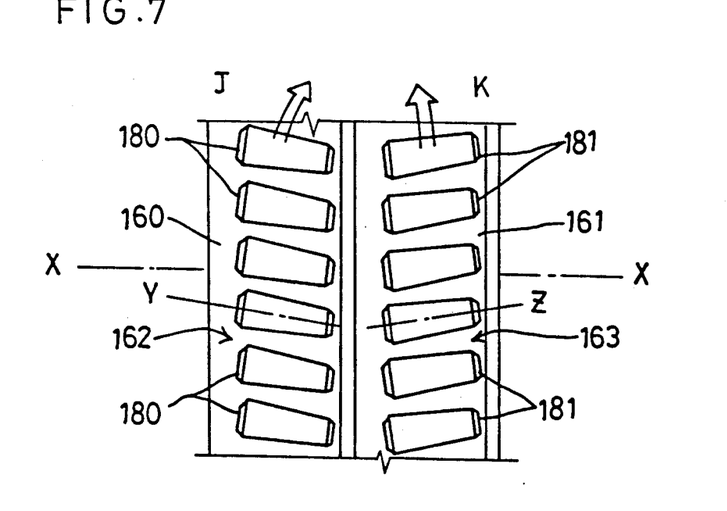
FIG. 7 is a view in development showing an arrangement of rollers in the third embodiment.

First and second tapered rollers 180 and 181 are arranged between the conical surfaces 162, 163, 174 and 175 of the first and second inner rings 160 and 161 and first and second outer rings 170 and 171. The first and second rollers 180 and 181 are capable of rolling movement around axes Y and Z inclined with respect to the main axis X as shown in FIGS. 6 and 7.

Further, springs 112 and 113 are mounted respectively between the first and second outer rings 170 and 171 and between the second outer ring 171 and a flange 111 fixed to an end of the casing 104.

Thrust bearings 114 are mounted respectively between the flange 111 and second inner ring 161 and between the flange 103 and first inner ring 160.

As shown in FIG. 6, the first outer ring 170 includes a piston portion 176 extending into the flange 103. The first outer ring 170 may be pushed rightward in FIG. 6 by supplying pressure oil into an oil passage 115 defined in the flange 103.

In the position shown in FIG. 6, the first outer ring 170 lies at a leftward stroke end. When, in the position shown in FIG. 6, the first transmission shaft 1 is rotated in the direction of arrow H, the first and second outer rings 170 and 171 cause the first and second rollers 180 and 181 to roll on the first and second inner rings 160 and 161 in the directions of arrows J and K, respectively.

As a result, the first rollers 180 move rightward in the drawings relative to the first outer ring 170 and first inner ring 160, i.e. toward a position where the conical surfaces 174 and 162 of the first outer ring 170 and first inner ring 160 are closed to each other. Consequently, the first rollers 180 are pressed between the conical surfaces 162 and 174 of the first inner ring 160 and first outer ring 170, thereby combining the first inner ring 160 and first outer ring 170 to transmit drive from the first transmission shaft 1 to the second transmission shaft 2 through the first outer ring 170 and first inner ring 160.

When the second roller 181 roll on the second inner ring 161 in the directions of arrow K, the second rollers 181 move toward a position where the conical surfaces 175 and 163 of the second outer ring 171 and second inner ring 161 are wider apart. Consequently, the second rollers 181 are not pressed between the conical surfaces 175 and 163, and the drive is not transmitted through the second outer ring 171 and second inner ring 161.

Conversely, when the first transmission shaft 1 is rotated in the direction opposite to the arrow H, the first and second rollers 180 and 181 move in directions opposite to the arrows J and K in FIG. 7. This results in the second roller 181 being pressed between the conical surfaces 175 and 163, whereby the drive is transmitted to the second transmission shaft 2 through the second outer ring 171 and second inner ring 161. The first rollers 180 remain free from such pressure, thereby effecting no drive transmission.

Next, a condition will be described in which the drive is not transmitted to the second transmission shaft 2 when the first transmission shaft 1 is rotated in the direction of arrow H or in the direction opposite thereto.

As noted hereinbefore, the first outer ring 170 located leftward in FIG. 6 includes a piston portion 176 for sliding controls. When pressure oil is supplied to the oil passage 115 to push the first outer ring 170 rightward in FIG. 6, the second outer ring 171 also is pushed rightward by the action of spring 112 or through contact between the first and second outer rings 170 and 171.

Since the casing 104 and first and second inner rings 160 and 161 are not slidable by the presence of the stoppers 105 and 110, the conical surfaces 174 and 175 of the first and second outer rings 170 and 171 are positively moved rightward away from the conical surfaces 162 and 163 of the first and second inner rings 160 and 161. In this way, the drive transmission is broken reliably.

[Fourth Embodiment]

Figure 8:
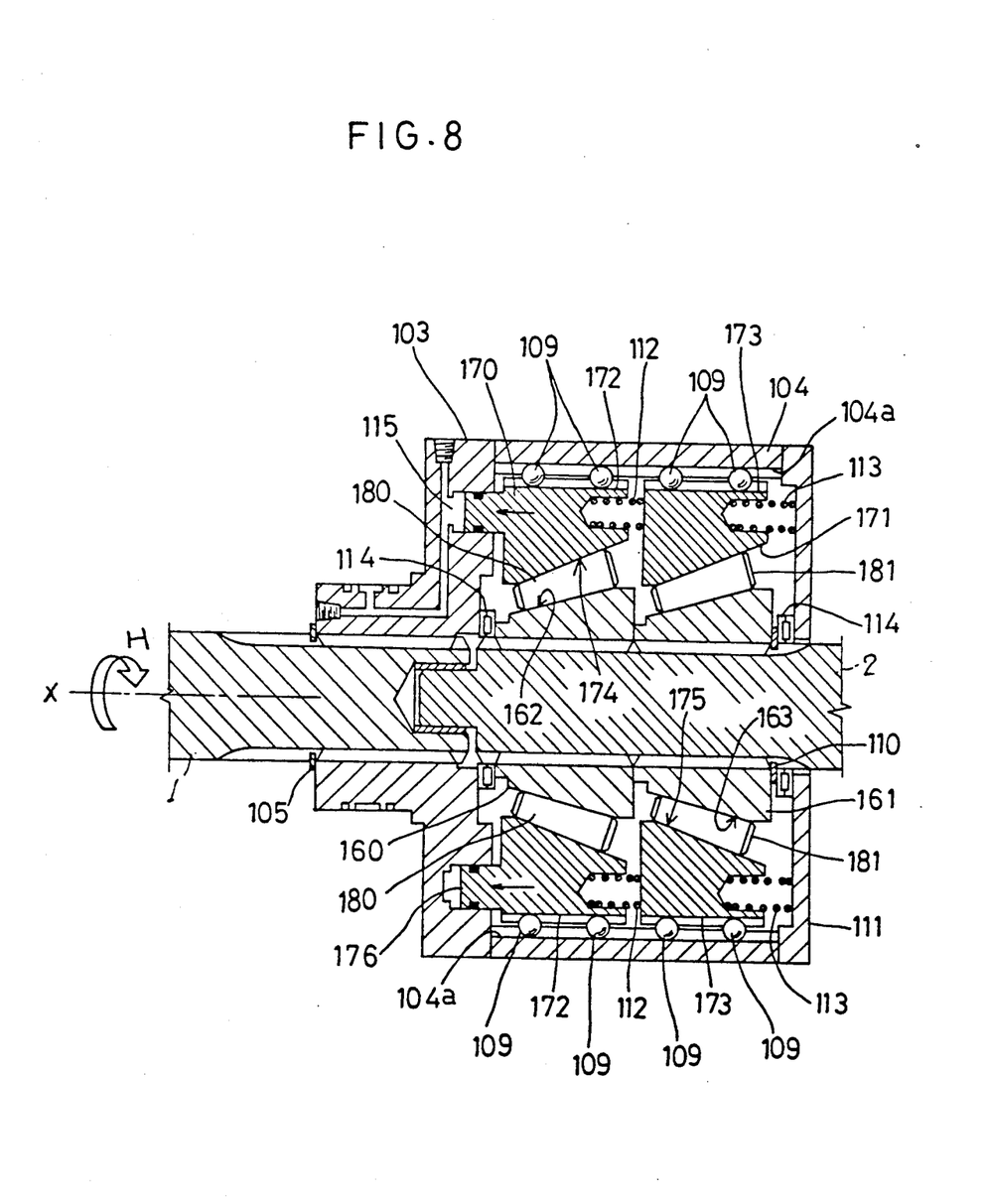
FIG. 8 is a sectional view of a rolling clutch apparatus in a fourth embodiment of the present invention.

FIG. 8 shows a fourth embodiment which differs from the third embodiment in that the first and second inner rings 160 and 161 and first and second outer rings 170 and 171 are facing the opposite direction to the direction in the third embodiment. Thus, in FIG. 8, like reference numbers are used to identify like elements having substantially the same functions in the third and fourth embodiments.

In the position shown in FIG. 8, the first outer ring 170 is caused to slide rightward by the pressure oil supplied to the oil passage 115. The second outer ring 171 is caused by the spring 112 to slide rightward also.

In the position shown in FIG. 8, the first rollers 180 are pressed between the conical surfaces to transmit drive when the first transmission shaft 1 is rotated in the direction of arrow H, and the second rollers 181 are pressed between the conical surfaces to transmit drive when the first transmission shaft 1 is rotated in the direction opposite to the arrow H. When the pressure oil is drained, the first and second outer rings 170 and 171 are caused by the springs 112 and 113 to slide leftward in FIG. 8. As a result, the drive transmission is broken.

While the first and second outer rings 170 and 171 are slidable in the third and fourth embodiments, it is possible to fix the outer rings 170 and 171 to the casing 104, with the first and second inner rings 160 and 161 slidable (leftward in FIG. 6 and rightward in FIG. 8) relative to the second transmission shaft 2. Further, drive may be transmitted from the first and second inner rings 160 and 161 to the first and second outer rings 170 and 171 instead of the transmission from the outer rings 170 and 171 to the inner rings 160 and 161.

[Fifth Embodiment]

Figure 9:
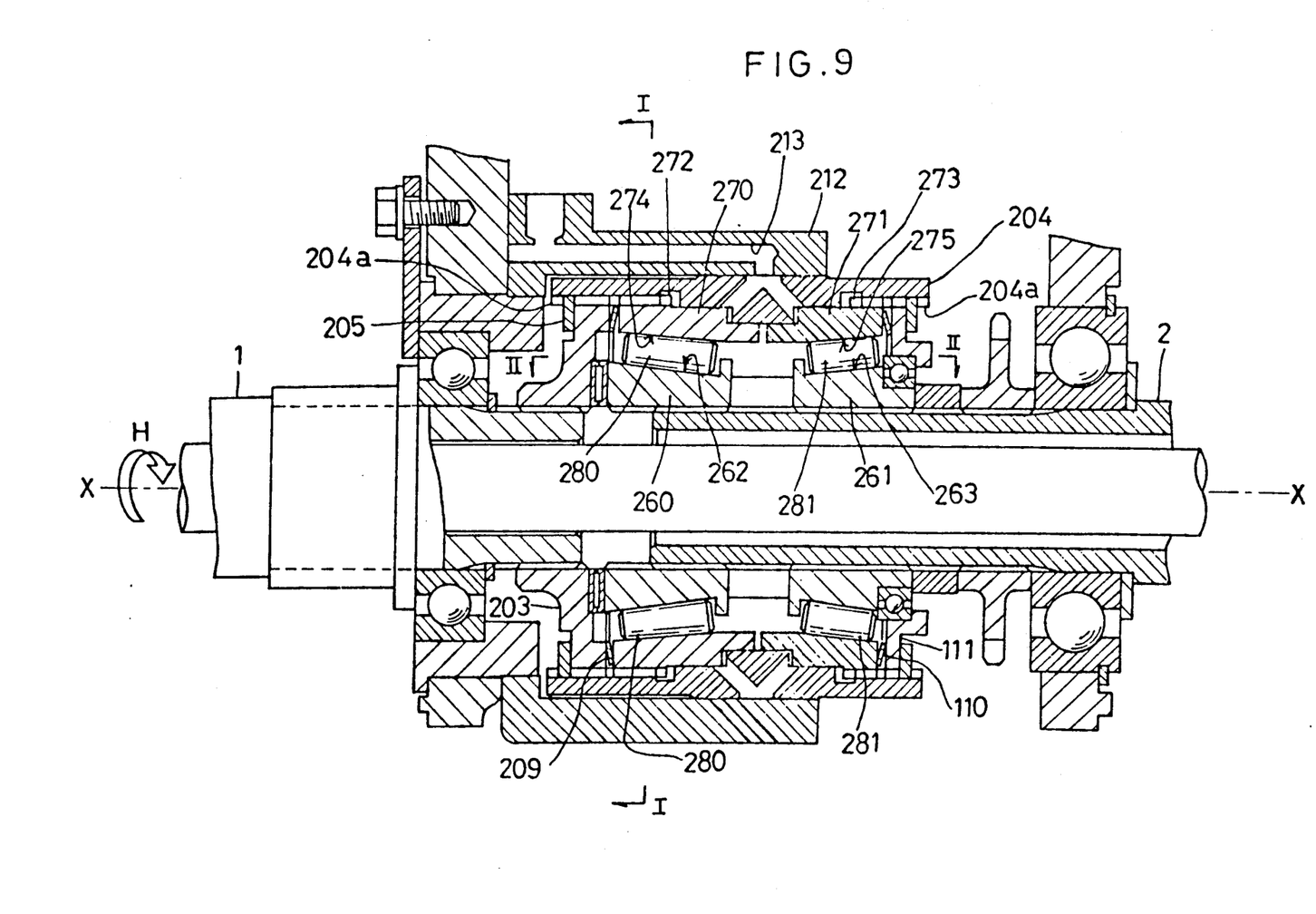
FIG. 9 is a sectional view of a rolling clutch apparatus in a fifth embodiment of the present invention.

As shown in FIG. 9, a fifth embodiment includes a tubular, first, drive transmission shaft 1, and a second, driven transmission shaft 2 supported coaxially and relatively rotatably in the first transmission shaft 1.

The first transmission shaft 1 carries a flange 203 splined thereto, and a tubular casing 204 is fixed to the flange 203. Further, the first transmission shaft 1 includes a stopper 205 for locking the flange 203 against sliding movement relative to the first transmission shaft 1.

The second transmission shaft 2 carries a first and a second inner rings 260 and 261 splined thereto and defining conical outside surfaces 262 and 263, respectively, which are opposed to each other.

Figure 10:
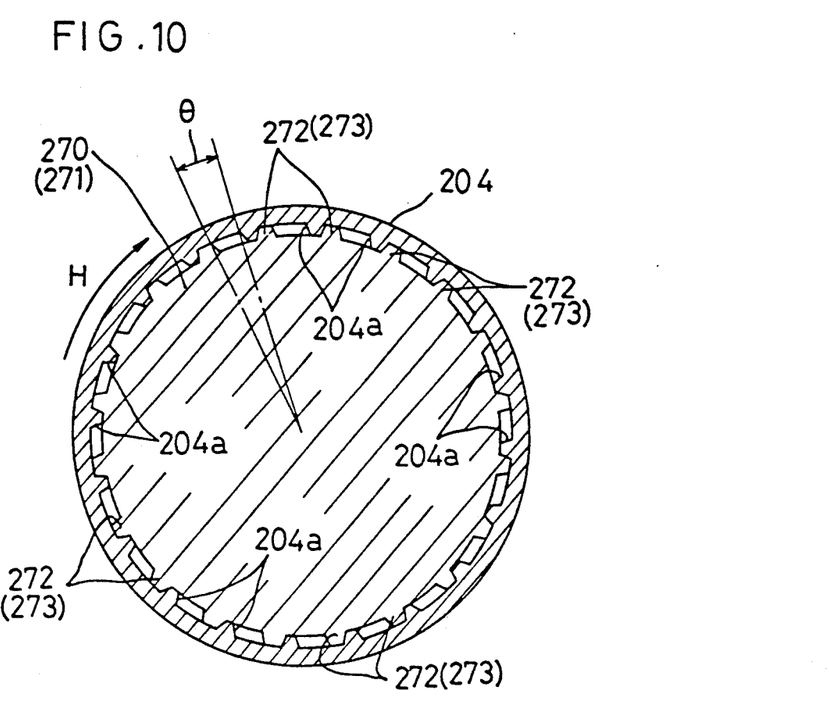
FIG. 10 is a sectional view of a casing and a first outer ring taken on line I—I of FIG. 9.

The casing 204 contains a first and a second outer rings 270 and 271 defining conical inside surfaces 274 and 275, respectively. As shown in FIG. 10, projections 272 and 273 are formed at intervals on outside surfaces of the first and second outer rings 270 and 271 while projections 204a are also formed on inside surfaces of the casing 204, these projections 204a, 272 and 273 being in engagement.

With this construction, the first and second outer rings 270 and 271 are slidable relative to the casing 104 and rotatable with the casing 204. Further, the first and second outer rings 270 and 271 are rotatable relative to the casing 104 within a predetermined angle $\theta$.

Figure 11:
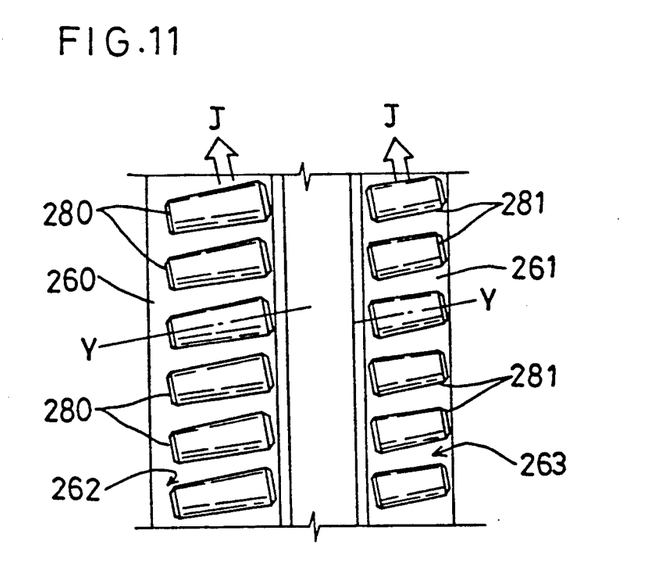
FIG. 11 is a view in development of rollers taken on line II—II of FIG. 9.

First and second tapered rollers 280 and 281 are arranged between the conical surfaces 262, 263, 274 and 275 of the first and second inner rings 260 and 261 and first and second outer rings 270 and 271. The first and second rollers 280 and 281 are capable of rolling movement around axes Y and Z inclined with respect to the main axis X as shown in FIGS. 9 and 11.

As shown in FIG. 9, a disc spring 209 is mounted between the flange 203 and first outer ring 270 to urge the latter rightward in FIG. 9 (in a direction to move the conical surfaces 262 and 274 of the first inner ring 260 and first outer ring 270 away from each other).

Further, a disc spring 210 is mounted between the second outer ring 271 and a flange 211 fixed to the casing 204 to urge the second outer ring 271 leftward in FIG. 9 (in a direction to move the conical surfaces 263 and 275 of the second inner ring 261 and second outer ring 271 away from each other).

The casing 204 has a stationary ring member 212 surrounding the casing 202. The ring member 212 defines an oil passage 213. The first outer ring 270 is slidable leftward and the second outer ring 271 rightward in FIG. 9 by supplying pressure oil into the oil passage 212.

In the position shown in FIG. 9, pressure oil is supplied to the oil passage 213 to cause the first and second outer rings 270 and 271 to press the first and second rollers 280 and 281. When, in the position shown in FIG. 9, the first transmission shaft 1 is rotated in the direction of arrow H, the first and second outer rings 270 and 271 cause the first and second rollers 280 and 281 to slightly roll on the first and second inner rings 260 and 261 in the directions of arrows J, respectively, as shown in FIG. 11. Then, the projections 204a, 272 and 273 of the casing 204 and first and second outer rings 270 and 271 assume the position shown in FIG. 10.

As a result, the first rollers 280 move left in the drawings relative to the first outer ring 270 and first inner ring 260, i.e. toward a position where the conical surfaces 274 and 262 of the first outer ring 270 and first inner ring 260 are closer to each other. Consequently, the first rollers 280 are pressed between the conical surfaces 262 and 274 of the first inner ring 260 and first outer ring 270, thereby combining the first inner ring 260 and first outer ring 270 to transmit drive from the first transmission shaft 1 to the second transmission shaft 2 through the first outer ring 270 and the first inner ring 260.

When the second roller 281 roll on the second inner ring 261 in the directions of arrow J, the second rollers 281 move toward a position where the conical surfaces 275 and 263 of the second outer ring 271 and second inner ring 261 are wider apart. Consequently, the second rollers 281 are not pressed between the conical surfaces 275 and 263, and the drive is not transmitted through the second outer ring 271 and second inner ring 261.

Conversely, when the first transmission shaft 1 is rotated in the direction opposite to the arrow H, the first and second rollers 280 and 281 roll slightly in the direction opposite to the arrows J in FIG. 11. This results in the second rollers 281 being pressed between the conical surfaces 275 and 263, whereby the drive is transmitted to the second transmission shaft 2 through the second outer ring 271 and second inner ring 261. The first rollers 280 remain free from such pressure, thereby effecting no drive transmission.

Next, a condition will be described in which the drive is not transmitted to the second transmission shaft 2 when the first transmission shaft 1 is rotated in the direction of arrow H or in the direction opposite thereto.

It is assumed that, as shown in FIG. 9, the first transmission shaft 1 is rotated in the direction of arrow H, and that the pressure oil is drained from the oil passage 213 in the ring member 212 while the drive is transmitted through the first outer ring 270 and first inner ring 260.

In this case, the disc springs 209 and 210 cause the first outer ring 270 to slide rightward and the second outer spring 271 to slide leftward. The first outer ring 270 quickly and smoothly slides leftward along outer faces of the first rollers 280 while slightly rotating (clockwise in FIG. 10) before the casing 204, thereby to break the drive transmission.

When the first transmission shaft 1 is rotated in the direction of arrow H, no drive transmission occurs through the second outer ring 271 and second inner ring 261. Consequently, the second outer ring 271 smoothly slides leftward under the urging force of disc spring 210, to produce a non-transmission state.

Next, it is assumed that the first transmission shaft 1 is rotated in the direction opposite to the arrow H, and that the pressure oil is drained from the oil passage 213 in the ring member 212 while the drive is transmitted through the second outer ring 271 and second inner ring 261.

In this case, the disc springs 209 and 210 cause the first outer ring 270 to slide rightward and the second outer spring 271 to slide leftward. The second outer ring 271 quickly and smoothly slides leftward along outer faces of the second rollers 281 while slightly rotating (counterclockwise in FIG. 10 but the projections 204a, 272 and 273 contact one another in a state opposite to the state shown in FIG. 10) before the casing 204, thereby to break the drive transmission.

When the first transmission shaft 1 is rotated in the direction opposite to the arrow H, no drive transmission occurs through the first outer ring 270 and first inner ring 260. Consequently, the first outer ring 270 smoothly slides rightward under the urging force of disc spring 209, to produce a non-transmission state.

[Sixth Embodiment]

Figure 12:
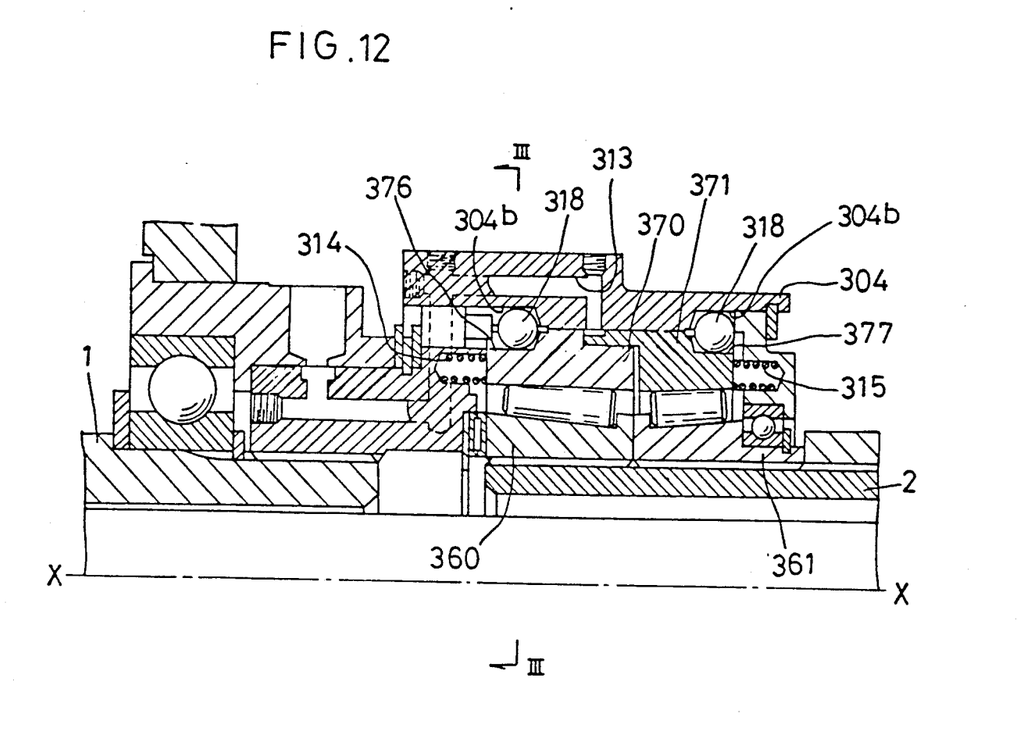
FIG. 12 is a sectional view of a rolling clutch apparatus in a sixth embodiment of the present invention.

FIG. 12 shows a sixth embodiment which has the same basic construction as the fifth embodiment. To avoid repetition, only the characteristic differences will be described. This embodiment includes coil springs 370 and 371 to slide the first and second outer rings 370 and 371 relative to the casing 304 to break the drive transmission. The casing 304 defines an oil passage 313 to receive pressure oil for sliding the first and second outer rings 370 and 371 to the non-transmission positions.

Figure 13:
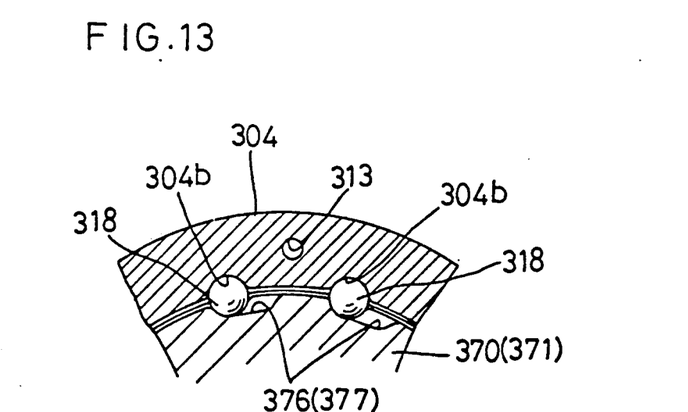
FIG. 13 is a sectional view of a casing and a first outer ring taken on line III—III of FIG. 12.

As shown in FIG. 13, grooves 304a, 376 and 377 are defined in the casing 304 and first and second outer rings 370 and 371, and balls 318 are fitted in to bridge these grooves 304a, 376 and 377. The grooves 376 and 377 of the first and second outer rings 370 and 371 are formed large to provide allowance.

In the fifth and sixth embodiments, as described above, the allowance is provided to enable a slight relative rotation between the first and second outer rings 370 and 371 and first and second inner rings 360 and 361. Consequently, the first and second outer rings 370 and 371 or first and second inner rings 360 and 361 are slidable quickly and smoothly to realize a speedy declutching operation.

In the fifth and sixth embodiments, the two one-way clutch type transmission mechanisms having different directions of transmission include rollers of different lengths. This accommodates a case where the transmitted torque varies between forward rotation and backward rotation. That is, the transmission mechanism that effects the greater torque transmission includes the larger rollers.

Further, while the first and second outer rings 270, 271, 370 and 371 are slidable in the fifth and sixth embodiments, these outer rings may be fixed, with the first and second inner rings 260, 261, 360 and 361 slidable to produce the non-transmission state. In this case, the allowance as shown in FIG. 10 or 13 are formed between the first and second inner rings 260, 261, 360 and 361 and second transmission shaft 2.

[Seventh Embodiment]

Figure 14:
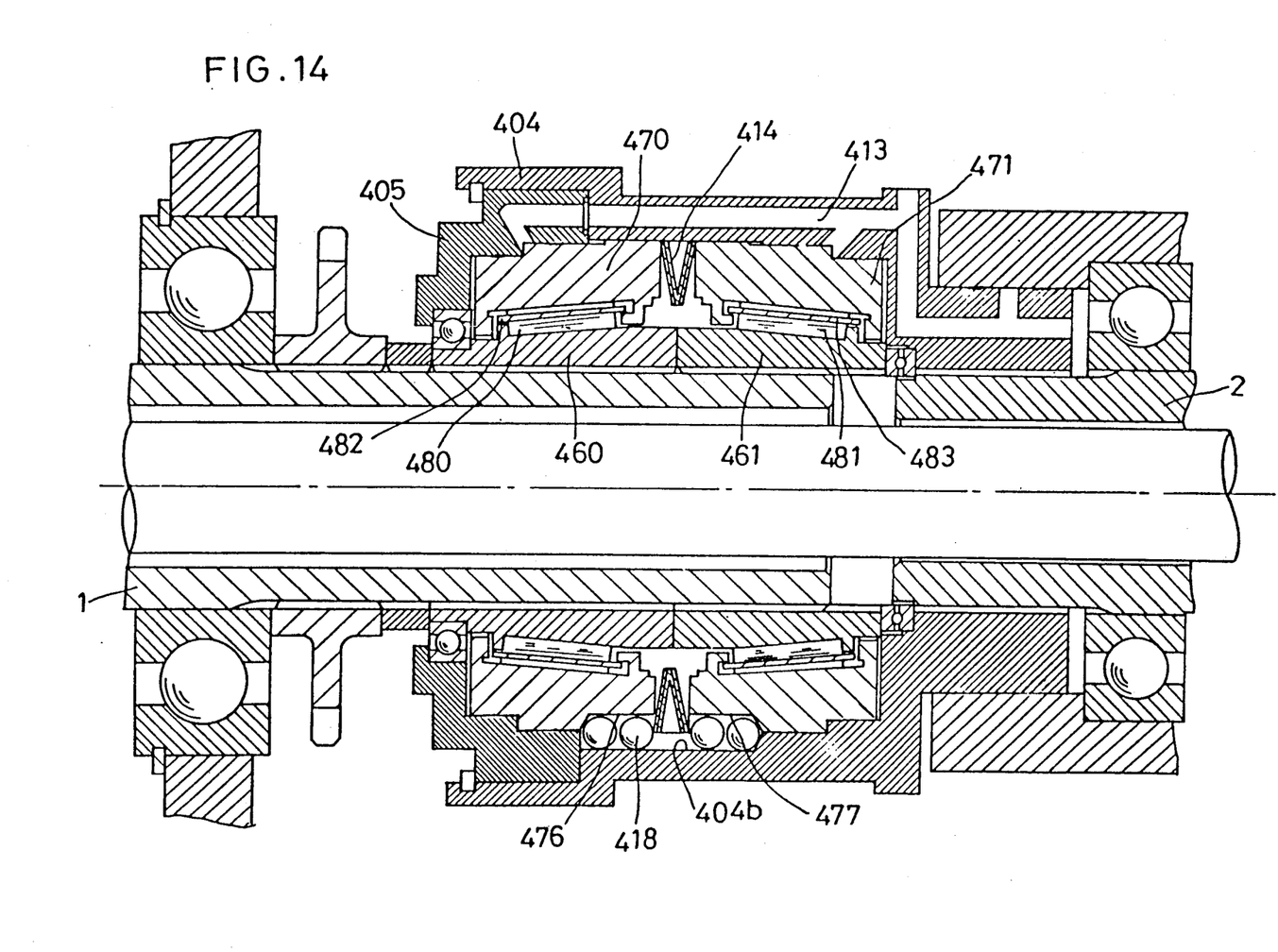
FIG. 14 is a sectional view of a rolling clutch apparatus in a seventh embodiment of the present invention.

FIG. 14 shows a seventh embodiment which differs from the sixth embodiment in that a declutching spring 414 is disposed between the two one-way clutch type transmission mechanisms having different directions of transmission, i.e. between first and second outer rings 470 and 471, pressure oil being supplied to lateral faces of the first and second outer rings 470 and 471 remote from each other.

The casing 404 is open at the left side thereof in FIG. 14, which is closed by an auxiliary casing 405. The casing 404 and 405 define an oil passage 413 for supplying pressure oil to the first and second outer rings 470 and 471. As in the preceding embodiments, the first and second outer rings 470 and 471 and first and second inner rings 460 and 461 are mounted in the ring-like space defined by the casings 404 and 405 and shaft 1 and/or shaft 2. First rollers 470 are mounted between the first outer ring 470 and first inner ring 460, and second rollers 481 between the second outer ring 471 and second inner ring 461.

Reference numerals 482 and 483 denote retainers for holding the first and second rollers in position. The preceding embodiments also include such retainers in some form, but they are omitted from the drawings for expediency of illustration.

In this embodiment also, grooves 404b, 476 and 477 are defined in the casing 404 and first and second outer rings 470 and 471, and balls 418 are fitted in these grooves 404b, 476 and 477 to form ball splines. This construction enables smooth axial movement of the first and second outer rings 470 and 471.

This embodiment functions in approximately the same way as the sixth embodiment, with an overall construction simplified in that the spring 414 is provided between the first and second outer rings 470 and 471 to move the first outer ring 470 axially leftward and the second outer ring 471 rightward for breaking the contact between the outer rings and rollers, i.e. for breaking the drive transmission. To produce the transmission state, of course the pressure oil is supplied through the oil passage 413 to move the first and second outer rings 470 and 471 toward each other, against the resilient force of the spring 414, and into engagement with the corresponding rollers.

What is claimed is:

1. A rolling clutch apparatus with two one-way clutch mechanisms each having an inner ring defining a conical outside surface, an outer ring disposed coaxially with the inner ring and defining a conical inside surface, and conical rollers arranged between the conical surface of the inner ring and the conical surface of the outer ring, said clutch apparatus comprising:

first transmission means including one of said clutch mechanisms for allowing transmission only in a forward rotating direction, second transmission means including the other of said clutch mechanisms for allowing transmission only in a backward rotating direction, first shift means for shifting one of the inner ring and the outer ring of said first transmission means relative to the conical rollers of said first transmission means for engagement and disengagement therebetween, second shift means for shifting one of the inner ring and the outer ring of said second transmission means relative to the conical rollers of said second transmission means for engagement and disengagement therebetween, and control means for simultaneously controlling said first shift means and said second shift means to disengage the conical rollers of said first transmission means using said first shift means and simultaneously disengage the conical rollers of said second transmission means using said second shift means.

2. A clutch apparatus as claimed in claim 1, wherein said first transmission means and said second transmission means are arranged axially.

3. A clutch apparatus as claimed in claim 1, wherein said second transmission means is disposed concentrically with and radially outwardly of said first transmission means.

4. A clutch apparatus as claimed in claim 3, wherein the outer ring of said first transmission means and the inner ring of said second transmission means are integrated.

5. A clutch apparatus as claimed in claim 1, wherein said first and second transmission means are contained in a common housing, said first and second shift means being splines formed to enable axial displacement between the outer rings of said first and second transmission means and said housing.

6. A rolling clutch apparatus with one-way clutch mechanisms each having an inner ring defining a conical outside surface, an outer ring disposed coaxially with the inner ring and defining a conical inside surface, and conical rollers arranged between the conical surface of the inner ring and the conical surface of the outer ring, said clutch aparatus comprising:

first transmission means including one of said clutch mechanisms for allowing transmission only in a forward rotating direction, second transmission means including the other of said clutch mechanisms for allowing transmission only in a backward rotating direction, first shift means for shifting one of the inner ring and the outer ring of said first transmission means relative to the conical rollers of said first transmission means for engagement and disengagement therebetween, second shift means for shifting one of the inner ring and the outer ring of said second transmission means relative to the conical rollers of said second transmission means for engagement and disengagement therebetween, control means for simultaneously controlling said first shift means and said second shift means to break transmission through said first and second transmission means, and wherein said first and second transmission means are contained in a common housing, said first and second shift means being formed of a cylinder portion defined by said housing, and the outer rings of said first and second transmission means acting as pistons axially slidable along said cylinder portion.

7. A clutch apparatus comprising:

a housing, a pair of first and second inner rings each defining a conical outside surface and drivingly connected to a transmission shaft, a pair of first and second outer rings and each defining a conical inside surface and drivingly connected to said housing, a plurality of first rollers arranged between the conical surface of said first inner ring and the conical surface of said first outer ring, said first rollers having rotational axes thereof inclined with respect to an axis of said first inner ring, a plurality of second rollers arranged between the conical surface of said second inner ring and the conical surface of said second outer ring, said second rollers having rotational axes thereof inclined with respect to an axis of said second inner ring, and means for simultaneously shifting said first and second inner rings or said first and second outer rings from an engaged position to a disengaed position to cancel a driving contact between said first and second inner rings or said first and second outer rings and both said first and second rollers, whereby, when one of said housing and said transmission shaft is rotated in a predetermined direction and said first and second inner rings and said first and second outer rings are in said engaged position, said first rollers are rolled and displaced axially of said transmission shaft to be pressed between the conical surfaces of said first inner ring and said first outer ring, to cause said first inner ring and said first outer ring to rotate together for drive transmission, and, when one of said housing and said transmission shaft is rotated in a direction opposite to said predetermined direction and said first and second inner rings and said first and second ourter rings are in said engaged position, said second rollers are rolled and displaced axially of said transmission shaft to be pressed between the conical surfaces of said second inner ring and said second outer ring, to cause said second inner ring and said second outer ring to rotate together for drive transmission.

8. A clutch apparatus as claimed in claim 7, wherein said first and second outer rings and said housing define allowance means in connecting regions thereof for allowing relative rotation therebetween within a predetermined angle: $\theta$.

9. A clutch apparatus as claimed in claim 7, wherein said first and second inner rings and said transmission shaft define allowance means in connecting regions thereof for allowing relative rotation therebetween within a predetermined angle: $\theta$.

* * * * *

UNITED STATES PATENT AND TRADEMARK OFFICE
CERTIFICATE OF CORRECTION

PATENT NO.   : 5,109,964
DATED        : May 5, 1992
INVENTOR(S)  : Tetsu Fukui, Yoshimi Oota and Shigekazu Hasegawa It is certified that error appears in the above-identified patent and that said Letters Patent is hereby corrected as shown below:

Title Page:
Abstract Line 10 "axilly" should read --axially--.

Column 4 Lines 25-26 "mechanism" should read --mechanisms--.

Column 5 Line 32 "closed" should read --closer--.

Column 5 Line 41 "roll" should read --rolls--.

Column 7 Line 54 "roll" should read --rolls--.

Claim 7 Line 18 Column 11 "rings and" should read --rings--.

Claim 7 Line 17 Column 12 "ourter" should read --outer--.

Signed and Sealed this

Twentieth Day of July, 1993

Attest:

MICHAEL K. KIRK

*Attesting Officer*    *Acting Commissioner of Patents and Trademarks*